United States Patent [19]
Ng

[11] 4,384,592
[45] May 24, 1983

[54] LOW-NOISE VALVE TRIM
[75] Inventor: Kam W. Ng, Barrington, R.I.
[73] Assignee: International Telephone and Telegraph Corporation, New York, N.Y.
[21] Appl. No.: 212,666
[22] Filed: Nov. 28, 1980
[51] Int. Cl.³ ............................................. F16K 47/14
[52] U.S. Cl. .............................. 137/625.37; 137/625.3; 138/46
[58] Field of Search ........... 137/625.3, 625.37, 625.38; 138/40, 46

[56] References Cited
U.S. PATENT DOCUMENTS 3,776,278 12/1973 Allen .............................. 137/625.38
3,780,767 12/1973 Borg et al. ....................... 137/625.3
3,813,079 5/1974 Baumann et al. ........... 137/625.37 X
4,249,574 2/1981 Schnall et al. ............. 137/625.37 X

FOREIGN PATENT DOCUMENTS 564628 11/1932 Fed. Rep. of Germany ... 137/625.3
872010 1/1942 France ............................. 137/625.39

OTHER PUBLICATIONS

Masoneilan Bulletin No. 370 E SA, Supplement A, dated 5/5/77.

Primary Examiner—Arnold Rosenthal
Attorney, Agent, or Firm—John T. O'Halloran

[57] ABSTRACT

A cylindrical valve trim has holes in the valve trim wall that provide a fluid flow path through the valve. The holes pass through the wall at predetermined angles to create a plurality of counter-rotating vortices with parallel axes normal to the wall.

13 Claims, 6 Drawing Figures

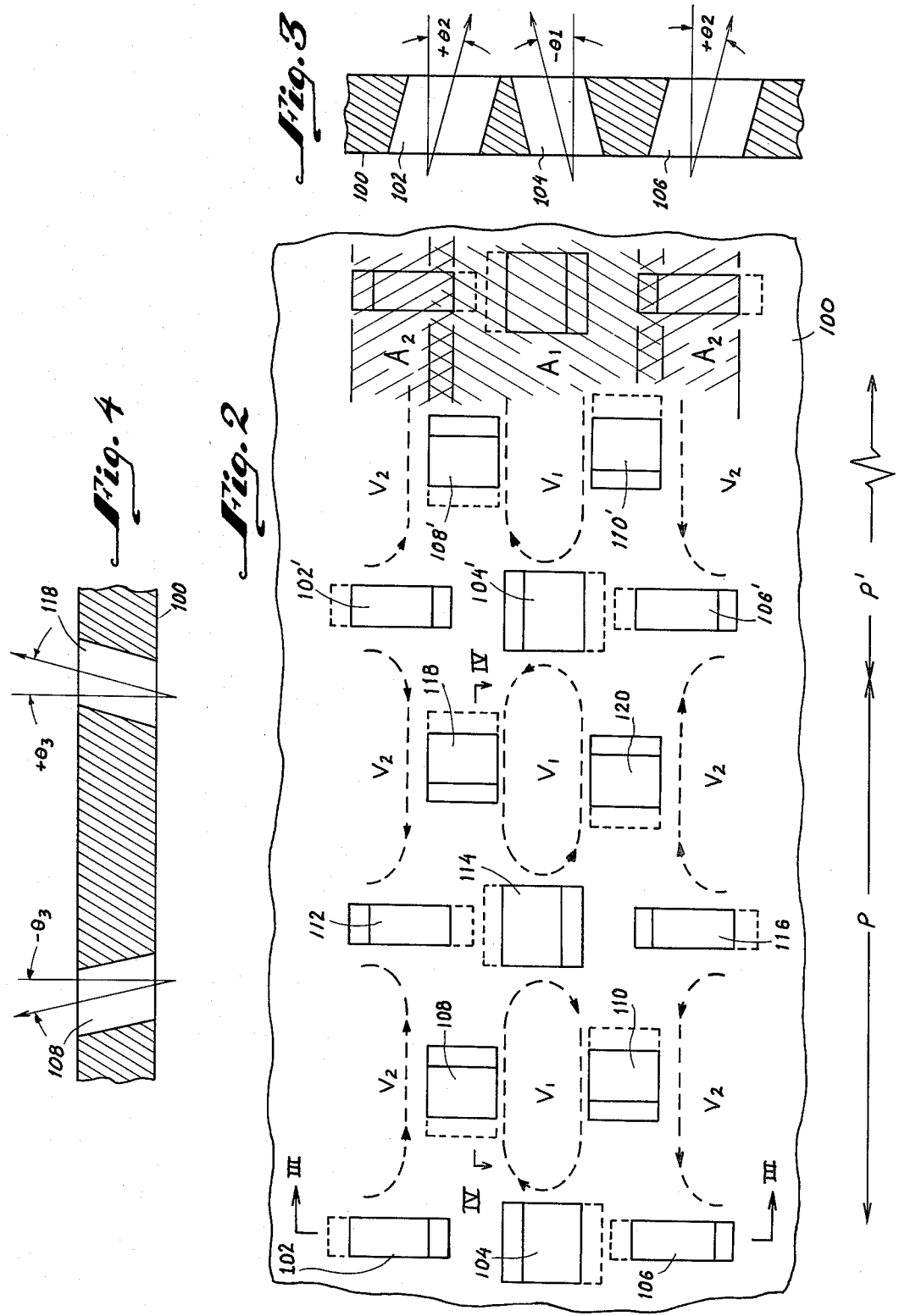

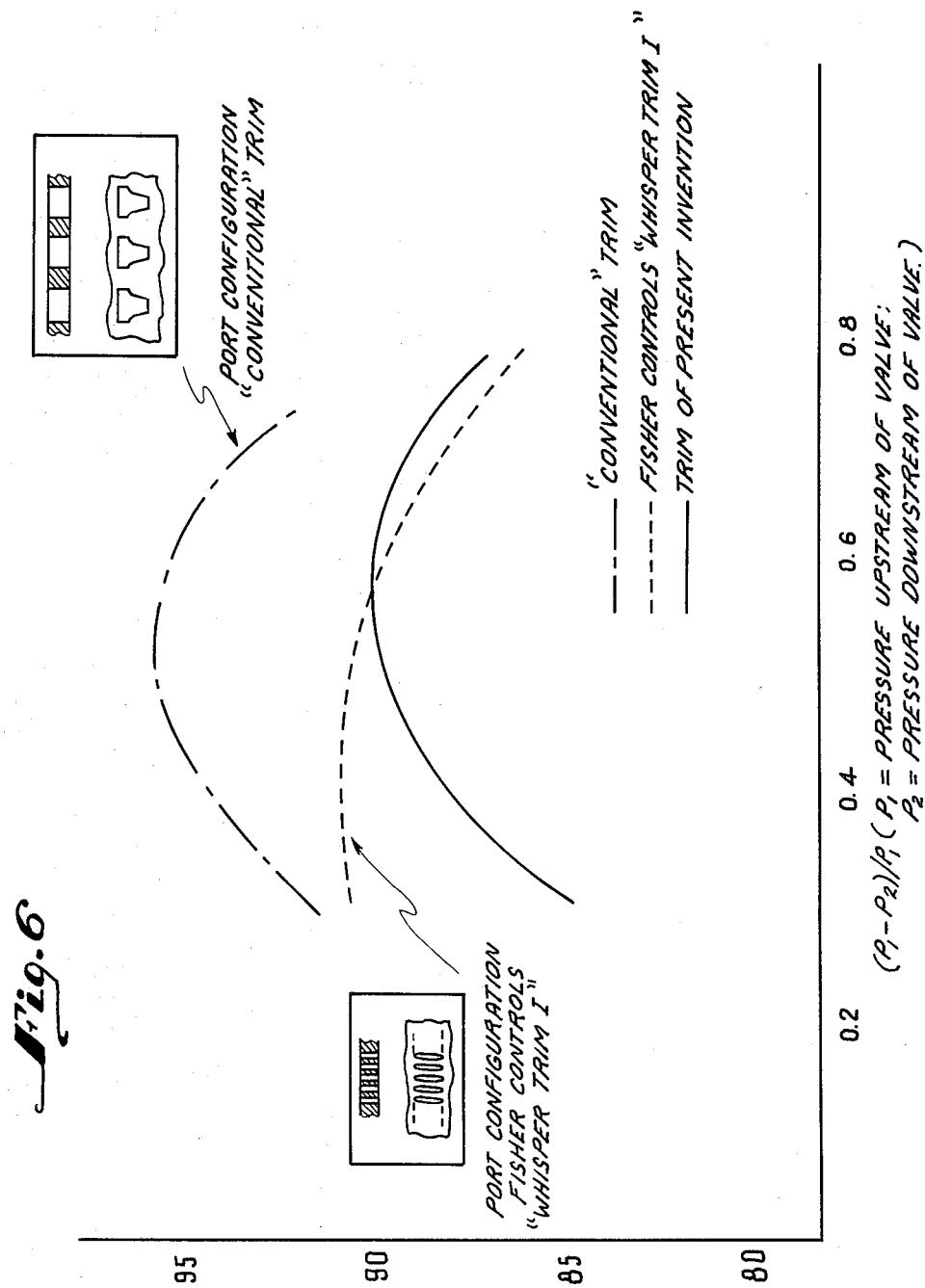

LOW-NOISE VALVE TRIM

BACKGROUND OF THE INVENTION

1. Field of the Invention

This invention relates to a valve trim and more particularly to a low-noise valve trim.

2. Description of the Prior Art

The noise generated by a fluid flowing through a valve has many sources. The most significant are violent turbulent mixing at low pressure drops across the valve, and shock waves at high pressure drops across the valve. At high pressure drops, above the critical pressure ratio, shock waves and complex interaction between turbulent mixing zones and shock waves are the main sources of noise when the fluid is compressible, such as a gas. When the fluid is a liquid, high pressure drops can also cause cavitation, another major noise source.

Two common approaches exist for reducing valve noise: reducing the noise generated and shielding the valve body and downstream piping with sound absorbing material.

Shielding has been effective to some degree, but is generally inconvenient and inefficient. The sound absorbing material covers the valve body and downstream piping, requiring labor for installation and making maintenance to the valve costly. And, at best, shielding only "covers" the noise; it does not act on the source. And because noise also causes valve vibration, the valve damage that often accompanies noise is not eliminated by shielding.

Reducing the noise generated by the fluid flowing through the valve is, therefore, the more promising and common approach. In cage trim valves, in which a cage trim guides a valving element in its travel relative to a valve seat, the trim configuration has been a focus of noise-reducing efforts. The typical modification to the trim restricts the fluid flow rate through the trim, which reduces fluid velocity and thus reduces noise. The prior art shows many such modifications, for example, U.S. Pat. No. 2,918,087 to Curran; U.S. Pat. No. 3,602,261 to Brown, et al.; U.S. Pat. No. 3,693,659 to Parola; 3,780,767 to Borg, et al.; U.S. Pat. No. 3,813,079 to Baummann, et. al; and U.S. Pat. No. 4,041,982 to Lindner. All of those patents employ variations on a single approach: create myriad flow paths with small cross-sectional areas through the trim so that the fluid velocity through each flow path is reduced. However, those and all other known prior art devices for solving the problem of valve noise by reducing fluid velocity through the trim tend to become clogged by particulate matter entrained in the fluid and are difficult to manufacture. Thus, the known prior art approaches increase the cost of manufacturing and maintenance and decrease reliability.

In many fluid handling environments, for example, chemical or petrochemical plants, a valve that enhances mixing would be desirable. Many of the valve trims shown in the prior art inherently aid mixing and many devices have been proposed for fluid mixing, for example, U.S. Pat. No. 2,740,616 to Walden; U.S. Pat. No. 3,582,048 to Sarem; and U.S. Pat. No. 4,102,359 to Patel; and German Pat. No. 564,628 and British Pat. No. 166,542.

However, the known prior art does not include a valve trim that will reduce noise levels, efficiently mix the fluid flowing through the valve and resist clogging by particulate matter entrained in the fluid flow.

SUMMARY OF THE INVENTION

The present invention involves a valve trim comprising a noise-reducing means for creating a flow field in the fluid passing through the valve, the flow field including a plurality of vortices with axes substantially parallel to and spaced from each other, with each vortex rotating in the opposite direction from an adjacent vortex.

The noise-reducing means may be angled passages which, with the present invention, can be made large enough to inhibit clogging because fluid velocity is reduced by converting the flow into vortices rather than by restricting the flow. Thus, clogging is reduced. In addition, the geometry of the trim may be chosen to shift the noise to a higher frequency less offensive to human hearing.

BRIEF DESCRIPTION OF THE DRAWINGS

FIG. 2 is a schematic of a valve trim of the present invention illustrating its operating principal.

FIG. 3 is a sectional view along line III—III in FIG. 2.

FIG. 4 is a sectional view along line IV—IV in FIG. 2.

FIG. 6 is a graph that plots the results of a test comparing a valve trim according to the present invention with two prior art valve trims.

DETAILED DESCRIPTION OF THE PREFERRED EMBODIMENTS

Figure 1:
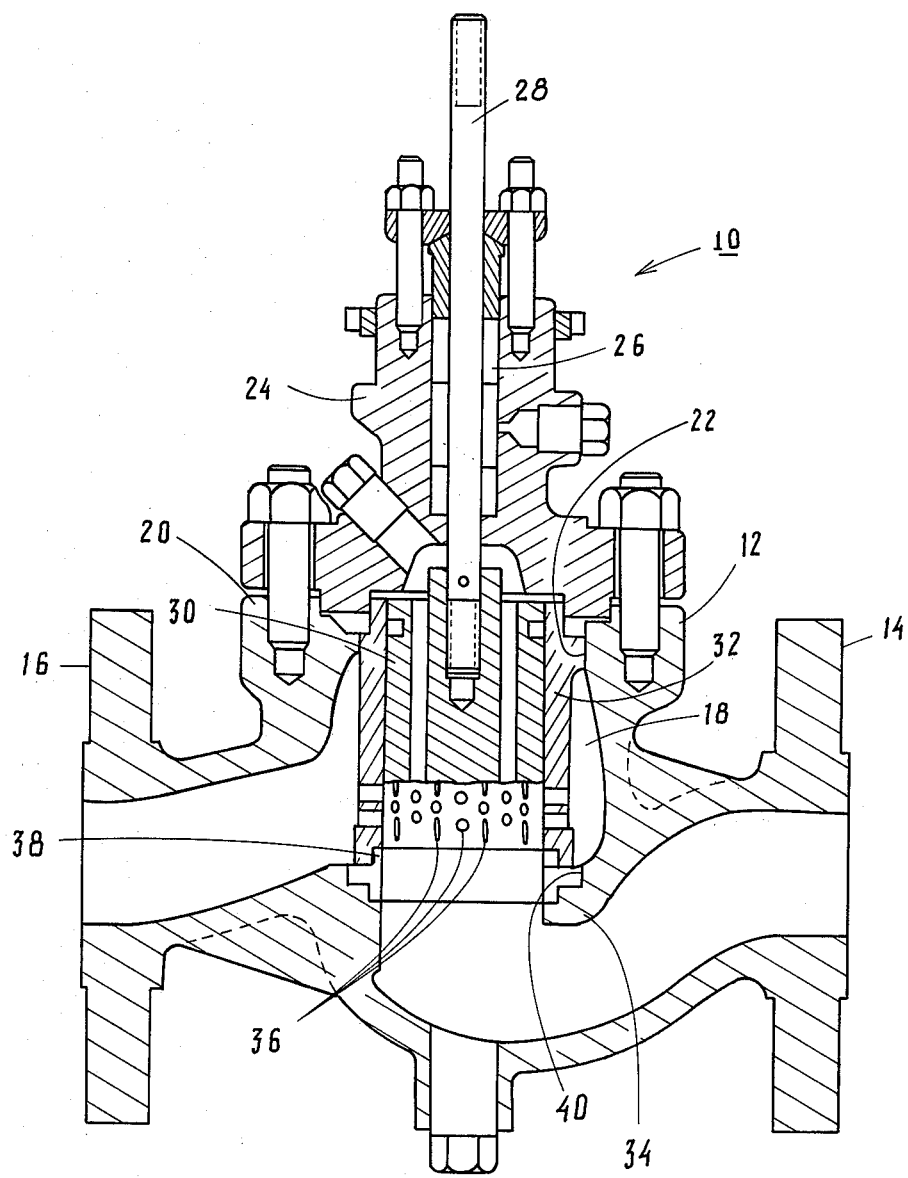
FIG. 1 is a sectional view of a valve having the trim of the present invention installed therein.

FIG. 1 shows a cage trim valve 10, conventional but for the inclusion of the present invention. The valve 10 includes a valve body 12. The valve body 12 has two flanges 14 and 16 that enable the valve to be connected into a fluid flow line (not shown). The valve body 12 defines a hollow valve chamber 18. A flange 20 surrounds an opening 22 in the valve body 12 that provides access to the valve chamber 18. A valve bonnet 24 is secured to the flange 20. The valve bonnet 24 has a threaded central bore 26 that accepts therein a valve stem 28 for rotation. The valve stem 28 moves axially when rotated relative to the valve body 12. The end of the valve stem 28 extends into the valve chamber 18 and is there fixed to a valve plug 30. Rotation of the valve stem 28, therefore, moves the plug 30 relative to the valve body 22.

A trim 32 guides the axial movement of the plug 30. The trim 32 is held in place between the bonnet 24 and a partition 34 in the valve body 12. Orifices 36 in the wall of the trim 32 and the central opening in the partition 34 provide a fluid flow path through the valve 10. As the plug moves axially, it closes or opens the orifices 36 and thus controls the amount of fluid flow through the valve. The structure described so far is conventional and well-known to those of ordinary skill in the art, who would be able to make and use such a valve without further description. Hammel Dahl, a division of ITT Grinnell Valve Co., Inc., a subsidiary of the assignee of the present invention, sells such valves under the name V500 Series Cage Trim Valves.

My presentation at the Winter Annual Meeting of the American Society of Mechanical Engineers, entitled, "Aerodynamic Noise Generation in Control Valves," discusses noise generation by valves such as the valve 10 when the fluid is a gas. Referring still to FIG. 1, the orifices 36 have been the focus of those skilled in the art in attempting to reduce noise. Patents listed above show that the conventional approach involves making the orifices small, or otherwise altering their geometry, to provide a tortuous flow path through the trim and severely restrict the flow through the valve. The present invention avoids the problems inherent in that approach and simultaneously improves the mixing of the fluid passing through the valve.

FIGS. 2 through 4 demonstrate the principal of operation of the trim of the present invention. FIG. 2 represents a trim according to the present invention. The trim comprises a wall 100 having a plurality of passages 102-120 therethrough for defining the flow path through the valve. In a valve in which the trim guides the valve plug, like that shown in FIG. 1, the wall 100 would form the wall of trim 32. In that case, especially if the trim is wrapped into a circular cylinder, the passages are spaced in a pattern P that endlessly repeats itself around the periphery of the cylinder.

Each pattern P includes ten passages arranged in a central zone $A_1$ and two peripheral zones $A_2$. Each pattern P has four columns of passages. The first column includes the passages 102, 104 and 106. As shown in FIG. 3, the passages 102 and 106 extend through the wall 100 at a penetration angle $+\theta_2$. The "penetration angle" of a passage is defined as the angle between the passage centerline and a line normal to the wall 100 and moving clockwise from the normal line to the passage centerline defines a positive penetration angle. The passage 104 extends through the wall 100 at a penetration angle of $-\theta_1$.

The second column in pattern P contains the passages 108 and 110. The passage 108 in the second column has a penetration angle of $-\theta_3$, as shown in FIG. 4. The other passage 1110 in the second column has a penetration angle of $+\theta_3$. Note, however, that the plane formed by the centerlines of passages 102, 104 and 106 and a line normal to the wall 100 is normal to the plane formed by the centerlines of passages 108 and 110 and a line normal to the wall 100.

The passages 112, 114 and 116 form a third column. Passages 112 and 116 have penetration angle $-\theta_2$ and passage 114 has a penetration angle $+\theta_1$. The remaining passages in the pattern P, passages 118 and 120 form penetration angle $+\theta_3$ and $-\theta_3$, respectively.

The passages 104, 108, 110, 114, 118, 120, 104', 108', etc. define the central Zone $A_1$. The passages 104, 108, 114 and 110 cooperate to form a complete vortex $V_1$ that rotates in the direction indicated by the arrows in FIG. 2; the passages 114, 120, 104' and 118 cooperate to form another complete vortex $V_1$, that rotates in the opposite direction; and so forth in the central zone $A_1$. The passages thus comprise noise-reducing means that create a flow field in the fluid passing through the wall. The flow field comprises the vortices $V_1$ that have substantially parallel axes spaced from each other, each of which vortex $V_1$ is rotating in a direction opposite to an adjacent vortex. The fluid velocity is reduced by converting the flow into a plurality of vortices, without introducing small, easily clogged flow restrictions into the fluid path. The counter-rotating vortices also inherently increase fluid mixing and thus make a valve including a trim according to the present invention particularly advantageous in chemical, petrochemical or other plants in which mixing of the fluid being transported is desirable. The reduced fluid velocity inherent in the flow field created by the present invention also reduces cavitation when the fluid passing through the valve is a liquid.

The peripheral zones $A_2$ on either side of central zone $A_1$ represent another aspect of the present invention that provides additional noise attenuation. The peripheral zones are defined by the passages 102, 106, 112, 116, 102', 106', etc. The passages 102, 108 and 112 cooperate to form a half vortex $V_2$, as do the sets of passages 106, 110 and 116, passages 112, 118 and 102' and passages 116, 120 and 106' and so forth. If the trim is placed properly in the valve, the vortices $V_2$ may be interposed between the listener and the complete vortices $V_1$. The passages in the peripheral zones $A_2$ are shorter on the sides facing the listener than the passages in the central zone $A_1$. This geometry of the passages in the peripheral zones shifts to a higher frequency the noise produced by the fluid exiting the passages in the peripheral zones $A_2$ and reaching the listener. The human ear is less sensitive to higher frequencies and perceives that frequency as "quieter" than lower frequencies with the same acoustic energy.

Thus a trim employing that aspect of the present invention also shifts some of the fluid's acoustic energy to a higher frequency and then uses the higher frequency source to shield the lower frequency sources, resulting in an even lower perceived noise level.

Except for the additional noise reduction that may be provided by having passages of a particular geometry in the peripheral zones $A_2$, the cross-sectional shape of the passages is not critical to the present invention. Nor is the magnitude of the penetration angles or the placement of the passages into a particular pattern. The present invention reduces the noise produced in a valve by providing a flow field comprising a plurality of vortices with spaced-apart, substantially parallel axes, each of which vortices rotates in a direction opposite to an adjacent vortex. Passages like those shown in FIG. 2, with the penetration angles shown, are exemplary and represent a valve trim that can be somewhat conveniently manufactured but that nevertheless demonstrates the principles on which the present invention is based.

Figure 5:
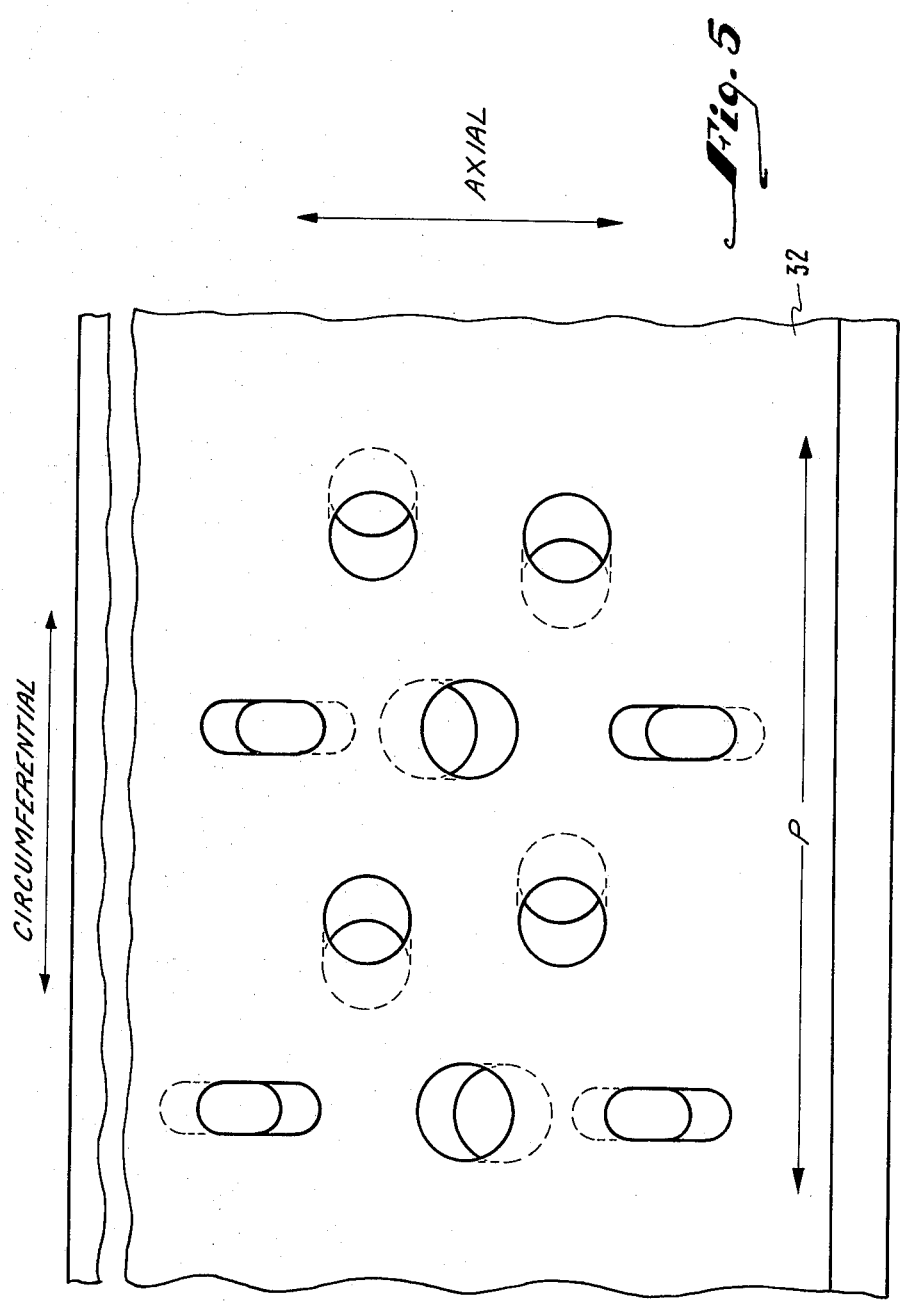
FIG. 5 is a schematic of a preferred embodiment of the valve trim of the present invention.

FIG. 5 shows a preferred embodiment of a trim according to the present invention. The trim shown in FIG. 5 represents the circular cylindrical trim 32 "unwrapped". FIG. 5 shows one pattern P of passages, which repeats endlessly around the circumference of the trim 32. The passages in the central zone $A_1$, shown in FIG. 2, are circular in the preferred embodiment of the invention, and the passages in the peripheral zones $A_2$ are slots with semicircular ends. The slots are twice as long as they are wide, a configuration that experimentation has shown gives the optimum distribution of acoustic energy. The penetration angles of all of the passages are 15°. The cross-sectional area of all of the passages are the same, so that the volumetric flow rate through the valve varies linearly with the position of the valve plug 30.

The trim 32 in FIG. 1 is installed in the valve on a seat ring 38 that fits into an annular recess 40 around the central hole in the partition 34. The seat ring 38 can, for convenience, be made symmetrical about a plane normal to its axis. That symmetry allows the seat ring 38 to be merely turned over and reinstalled, rather than replaced, when one side has shown excessive wear. Thus, each seat ring 38 will have twice the normal life.

FIG. 6 shows the result of a test involving a "conventional" trim, a Fisher Controls' Whisper Trim I, and a trim like that shown in FIG. 5. All of the trims were installed in a Hammel Dahl V500 Cage Trim Valve. The flow direction was from right to left as viewed in FIG. 1. Because the flow direction was from under the seat, the valve plug was unbalanced, rather than balanced as shown in FIG. 1. The ordinate of the graph in FIG. 6 is the dBA scale, which represents the manner in which the human ear responds to acoustic energy. The abscissa is the pressure ratio across the cage trim, expressed as $\Delta p/p_1$, or $(p_1-p_2)/p_1$, with $P_1=160+10$ psi. $\Delta p/p_1$ was varied by moving the valve plug. Note that at higher pressure ratios (valve less open), where shock waves occur, the noise level using the trim of the present invention is comparable to Fisher Controls' Whisper Trim I. However, at lower pressure ratios (valve more open), where violent turbulent mixing contributes most to valve noise, the trim of the present invention shows appreciable noise reduction.

The present invention has been described by reference to particular embodiments. Those of ordinary skill in the art will perceive a variety of modifications that those embodiments may be modified without departing from the spirit of invention. Thus, the appended claims, not the foregoing description, are intended to define the scope of the present invention.

I claim:

1. A valve trim comprising:
   a wall having a plurality of adjacent passages arranged in said wall and passing therethrough for providing a flow path through the valve; and
   noise reducing means for directing the fluid flow leaving each said passage according to the position of said passage in said wall and creating a flow field in the fluid, said flow field including a plurality of adjacent vortices with axes substantially normal to said wall and spaced from each other, each said vortex rotating in the opposite direction from an adjacent vortex;
   wherein said passages extend through said wall at predetermined penetration angles for directing the fluid flow leaving said passages so that adjacent passages cooperate to form said noise-reducing means and create said flow field and each said passage directs the flow for two adjacent vortices.

2. The valve trim recited in claim 1 wherein said wall comprises a cylindrical cage trim and said passages form an endlessly repeating pattern around said cylinder.

3. The valve trim recited in claim 1 wherein a first number of said passages are arranged in a first central zone and have a shape for causing the fluid passing therethrough to produce a first acoustic frequency and a second number of said passages, having a shape for causing the fluid passing therethrough to produce a second acoustic frequency higher than said first acoustic frequency, are arranged in two peripheral zones on either side of said central zone for interposition between a listener and said central zone.

4. The valve trim recited in claim 3 wherein said wall comprises a circular cylinder, said passages are arranged in columns extending axially of and in an endlessly repeating pattern around the circumference of said cylinder, said central and peripheral zones extend around the circumference of said cylinder, and said peripheral zones are spaced apart axially of said cylinder with said central zone disposed between said peripheral zones.

5. The valve trim recited in claim 4 wherein said first number of passages have the same dimension axially and circumferentially of said cylinder and said second number of passages are longer axially of said cylinder than circumferentially.

6. The valve trim recited in claim 5 wherein said second number of passages are twice as long axially as circumferentially.

7. The valve trim recited in claim 6 wherein said first number of passages are circular in cross-section and said second number of passages are slots with semicircular ends.

8. The valve trim recited in claim 7 wherein said penetration angle is substantially the same magnitude for all passages.

9. The valve trim recited in claim 8 wherein said penetration angle is 15°.

10. The valve trim recited in claims 2, 3, 4, 5, 6, 7, 8, or 9 wherein the cross-sectional area of all of said passages is substantially the same.

11. A valve comprising:
    a valve body including a valve chamber with an opening and a partition having an aperture therein;
    a bonnet closing said opening in said valve chamber;
    a hollow cylindrical trim held in place in said valve chamber between said partition and said bonnet and having a plurality of adjacent passages arranged in the wall thereof for defining, with said aperture in said partition, a flow path through the valve, wherein said passages extend through the wall of said cylinder at predetermined penetration angles and comprise noise-reducing means for directing the fluid flow-leaving each said passage according to the position of said passage in said wall and creating a flow field in the fluid, said flow field including a plurality of adjacent vortices with axes normal to the wall of said cylinder and spaced from each other, each said vortex rotating in the opposite direction from an adjacent vortex;
    a valve stem mounted in and for movement relative to said bonnet; and
    a valve plug guided by said trim for movement axially thereof upon movement of said valve steam for selectively opening and closing said passages to control the fluid flow through said valve;
    wherein said passages are arranged in columns extending axially and in an endlessly repeating pattern extending circumferentially of said cylinder and in a circumferentially extending central zone disposed between two peripheral zones spaced apart axially of said cylinder, a first number of said passages are disposed in said central zone and have a shape for causing the fluid passing therethrough to produce a first acoustic frequency, a second number of passages are disposed in said peripheral zones and have a shape for causing the fluid passing therethrough to produce a second acoustic frequency higher than said first acoustic frequency, and each said passage directs the flow for two adjacent vortices.

12. The valve recited in claim 11 wherein the cross-sectional area of each of said passage is substantially equal and each said penetration angle has substantially the same magnitude.

13. The valve recited in claim 12 wherein said first number of passages are circular in cross-section and said second number of passages are slots in cross-section longer axially than circumferentially of said cylinder, with semicircular ends, and the magnitude of said penetration angles is 15°.

* * * * *